United States Patent [19]

Koichi et al.

[11] 4,435,260
[45] Mar. 6, 1984

[54] METHOD AND APPARATUS FOR DESULFURIZATION AND DENITRIFICATION OF WASTE GAS BY MULTI-STAGE ELECTRON BEAM IRRADIATION

[75] Inventors: Yamada Koichi, Tokyo; Kawamura Keita, Fujisawa; Aoki Shinji, Tokyo, all of Japan

[73] Assignee: Ebara Corporation, Tokyo, Japan

[21] Appl. No.: 273,511

[22] Filed: Jun. 15, 1981

[30] Foreign Application Priority Data

Jun. 16, 1980 [JP] Japan ................................. 55-81088

[51] Int. Cl.³ .......................................... C01B 17/60
[52] U.S. Cl. .................................................. 204/164
[58] Field of Search ........................ 204/164, 174, 177

[56] References Cited

U.S. PATENT DOCUMENTS

| | | | |
|---|---|---|---|
| 3,188,167 | 6/1965 | Specht | 204/164 X |
| 3,562,127 | 2/1971 | Wooten et al. | 204/164 |
| 3,755,120 | 8/1973 | Kinser | 204/164 |
| 3,846,637 | 11/1974 | Gettinger | 250/546 |
| 3,959,661 | 5/1976 | Sanders | 422/183.04 |
| 3,960,687 | 6/1976 | Bakke et al. | 204/164 |
| 3,983,021 | 9/1976 | Henis | 204/164 |

FOREIGN PATENT DOCUMENTS 502063  3/1939  United Kingdom ................ 204/164

*Primary Examiner*—F. Edmundson
*Attorney, Agent, or Firm*—Howard L. Rose

[57] ABSTRACT

Removal of $NO_x$ and $SO_x$ from waste gases is carried out by irradiation of the gas with ionizing radiation at a dose such as to reduce the content of $NO_x$ and $SO_x$ to a first predetermined level and passing such gas through subsequent irradiating stages with the dose of irradiation of the gas in the last stage being determined by the levels of $NO_x$ and $SO_x$ entering said last stage whereby to reduce such contaminants to desired levels and thereafter passing the gas through an aerosol collector.

2 Claims, 7 Drawing Figures

METHOD AND APPARATUS FOR DESULFURIZATION AND DENITRIFICATION OF WASTE GAS BY MULTI-STAGE ELECTRON BEAM IRRADIATION

BACKGROUND OF THE INVENTION

This invention relates to a method and an apparatus for desulfurization and denitrification of waste gas by electron beam irradiation.

A technique has heretofore been developed, where with radiating electron beam to various waste gas containing nitrogen exides (NOx) and/or sulfur dioxide ($SO_2$), a small quantity of ammonia is added to the waste gas before, during or after the irradiation to make the ammonia react with NOx and $SO_2$ so that poisonous gas component is converted into an aerosol, which is then removed by a dust collector, an improved method of the technique has further been studied.

A typical flow sheet and apparatus of commercial plant to which said method is applied are illustrated in FIG. 1. The apparatus comprises a device for supplying ammonia (1), a single stage of irradiating unit (4) which has an irradiating reaction vessel (2) and generator for electron beam (3) as its main elements, and aerosol collecting device (5) for aerosol separation which is formed in the waste gas by irradiation. These devices are connected in series along a stream of the waste gas.

The data in FIG. 2 was obtained by irradiating waste gas with electron beams by use of the conventional apparatus comprising said devices. FIG. 2 shows the relative relationships between the absorbed dose by the waste gas, and each of desulfurization and denitrification efficiencies.

As will be apparent from FIG. 2, both efficiencies have a tendency to increase greatly with increasing absorbed dose at the beginning, and then the efficiencies increase more slowly by degrees. Particularly the denitrification efficiencies decrease after a maximum point of 90%, namely the relationship between denitrification efficiencies and the absorbed dose is roughly linear in the region where the absorbed dose is relatively small, not more than 1 Mrad, while in the region of more than 1 Mrad, the denitrification efficiencies decrease.

Therefore, as will be apparent from FIG. 2, for example in the case that more than 80% of the dentitrification efficiencies are required, the denitrification process is to be operated under uneconomical high dose condition and resulting efficiencies cannot reach more than 90%.

As a result of studies to develop a method and apparatus for treatment of a waste gas by which the aforementioned defect is corrected and economical operation with from 90–100% of denitrification efficiencies is possible, the inventors of this invention have succeeded in developing a novel and useful technique.

SUMMARY OF THE INVENTION

A feature of the method by the present invention is that the treatment of waste gas is carried out by using an apparatus comprising multiple stages (n-stages) of irradiation arranged in series (n is a natural number not less than 2) By the method of the present invention, sulfur dioxide and nitrogen oxides are removed by irradiating with multiple electron beams is done with remarkably high efficiency. In addition, the inventors have found that in contrast to the conventional apparatus, by use of the apparatus of this invention more than 90% of denitrification efficiency has been attained without difficulty and a dose required to obtain said efficiency has been much less than a dose necessary to attain said efficiency by the conventional apparatus.

Figure 3:
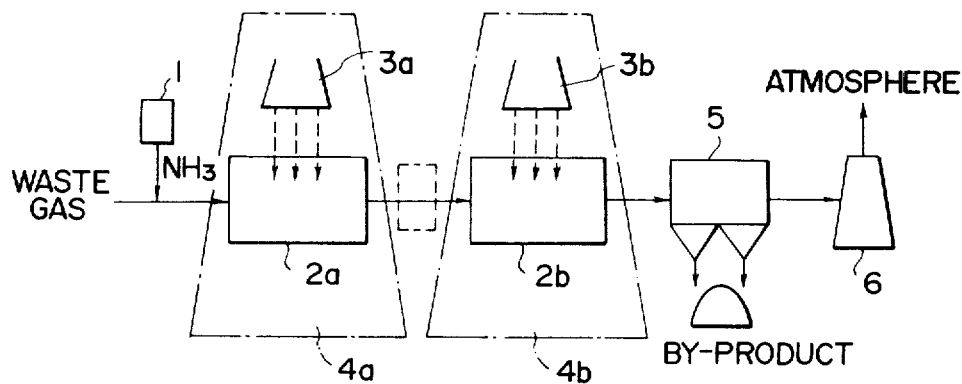
FIG. 3 is a flow sheet illustrating one embodiment of the present invention, where multiple stages of irradiation are used.

It is a feature of the method by the present invention that the process of desulfurization and denitrification is carried out by passing through the apparatus which is arranged as shown in FIG. 3. More particularly, the apparatus of the present invention consists of the following devices connected in series, that is (1) ammonia supplying device to supply a very small quantity of ammonia into the waste gas; (2) the first irradiating unit consisting of a reaction vessel equipped with an inlet for waste gas, an outlet for waste gas and windows for entry of an irradiating electron beam, and a generator for the electron beam arranged so that it is able to irradiate the waste gas in the reaction vessel through the windows; (3) (n−1) sets of irradiating units equipped with substantially same devices as said 1st unit (n is a natural number not less than 2); and (4) aerosol collecting device. Two sets of the irradiating units connected in series suffice for this invention. As a matter of course, more than three irradiating units may be used.

A practical treatment of the waste gas by this invention is carried out as follows. As is shown in FIG. 3, the waste gas is introduced into the first reaction vessel 2(a), and irradiated with an electron beam from a generator of electron beams 3(a) in the vessel. $NH_3$ from a device for supplying ammonia 1 is added to the waste gas before irradiation. In this case, the ammonia may be added to the waste gas during or after irradating.

The waste gas is irradiated in the first irradiating unit with a relatively large quantity of dose (for example 60% of the total dose), so that NOx (and/or SO₂) concentration of the waste gas is reduced to the considerable low level. Then, the waste gas from the first reaction vessel 2(a) is introduced into the second reaction vessel 2(a) and the waste gas in the vessel is irradiated with electron beam from the generator for electron beam 3(b) in the 2nd vessel to reduce the concentration of NOx (and/or SO₂) remaining in the waste gas from the first reaction vessel, to the desired level. The waste gas from the second vessel 2(b) is conducted into aerosol collecting device 5 and dust, mist and others are removed, then the purified waste gas is discharged into atmosphere through a chimney 6.

Figure 1:
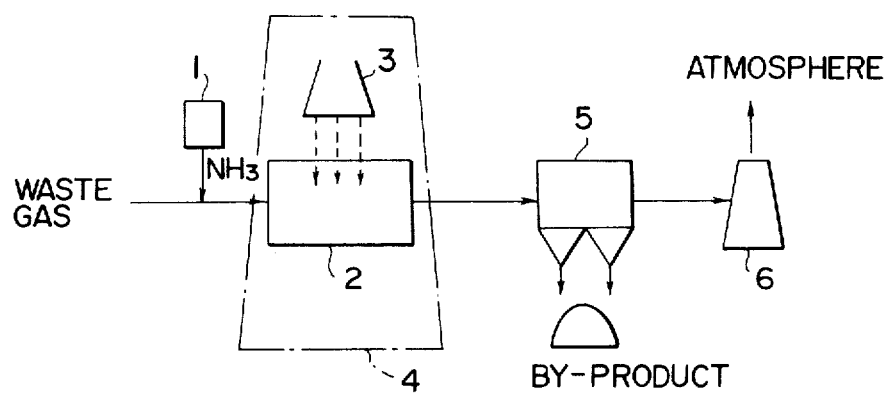
FIG. 1 is a flow sheet illustrating one typical embodiment of the conventional method for treating waste gas by irradiation with an electron beam in which a single stage of irradiation is used.
Figure 2:
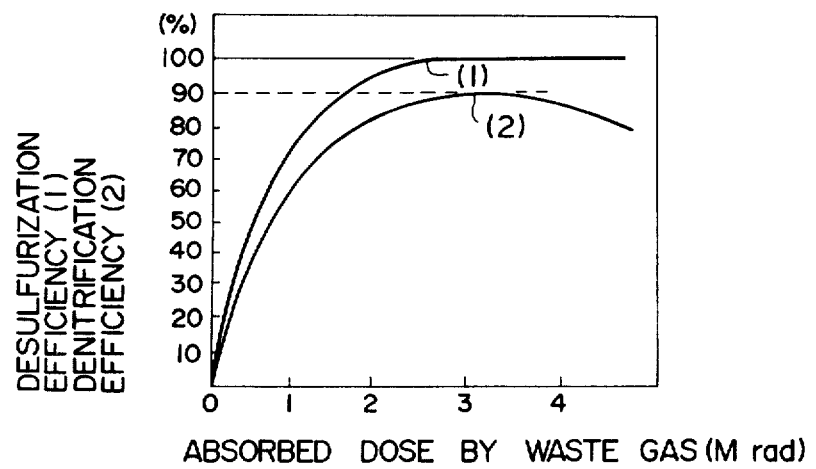
FIG. 2 is a graph showing the relationships between the absorbed dose by waste gas and each of desulfurization and denitrification efficiencies, which was obtained by treating ordinary waste gas from combustion process by the conventional electron beam irradiation method using a single stage of irradiation.

An appropriate value of a dose according to which the irradiation is carried out in the first irradiating unit can be determined by studying curves such as in FIG. 2 showing the relationships between absorbed doses and desulfurication or denitrification efficiencies which are previously obtained by an experiment on a waste gas to be treated.

In concrete terms, the appropriate value is one corresponding with a point which lies at the end of substantially straight range of the curve from the origin. The desulfurization and denitrification efficiencies are nearly constant, per unit dose and have relatively high levels in the range from the origin to the point.

Even in the case of treating the waste gas from the first irradiating unit, an appropriate value of a dose to be adopted in the second irradiating unit can be determined by the same curves of FIG. 2, previously obtained.

The most economical value of a dose to be adopted in each irradiating unit can be determined by conducting the above-mentioned experiments in which a value of dose in the first irradiating unit is varied.

The reason the method of this invention, where an apparatus providing multiple stages of irradiation is used, is quite superior to the conventional method using a single stage of irradiating, is as follows.

In an ordinary chemical reaction, reaction rate and conversion rate generally fall with lowering in concentration of reactants. On the contrary, in treating waste gas containing NOx and SO₂ by irradiation with an electron beam, the denitrification efficiency per unit dose remarkably increases with sharp reductions in the initial concentration of NO$_x$.

For example, where a waste gas with initial NOx concentration of 200 ppm was treated by irratiation using the conventional desulfurizating and denitrifying apparatus with a single stage irradiating unit, the denitrification efficiency with a dose of 1.0 Mrad and 2.0 Mrad, is 70% and 80% respectively. On the other hand, in case of treating a waste gas with initial NOx concentration of 60 ppm, by the same apparatus, the denitrification efficiency with a dose of 0.1 Mrad, 0.5 Mrad and 1.0 Mrad, is 30%, about 90% and almost 100% respectively.

Figure 4A:
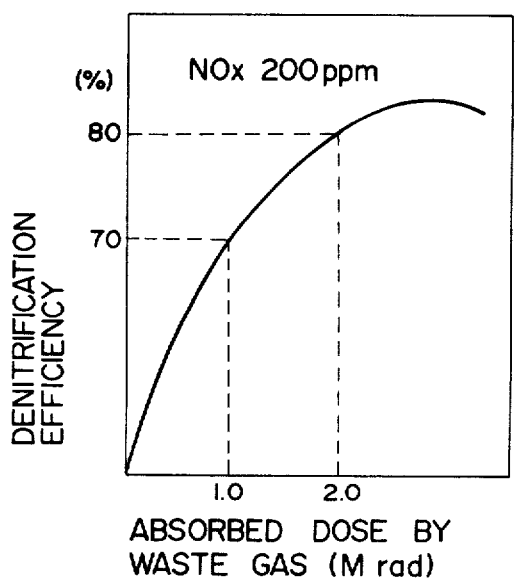
FIG. 4(a) is a graph showing the relationships between the absorbed dose by waste gas and denitrification efficiencies which was obtained by treating the waste gas with initial $NO_x$ concentration of 200 ppm by irradiation with an electron beam.
Figure 4B:
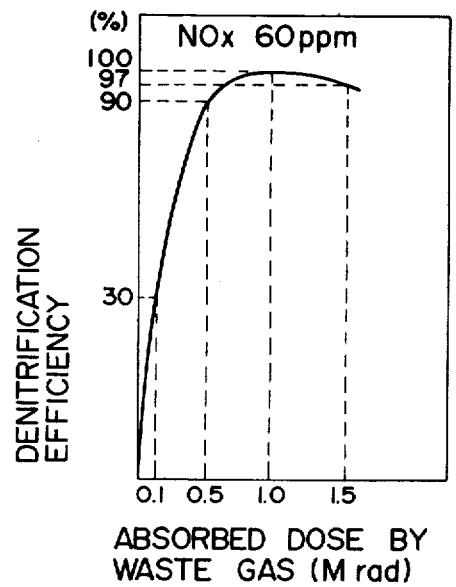
FIG. 4(b) is a graph showing the relationships between the absorbed dose by waste gas and denitrification efficiencies obtained by treating the waste gas with initial $NO_x$ concentration of 60 ppm by irradiation with an electron beam.
Figure 4C:
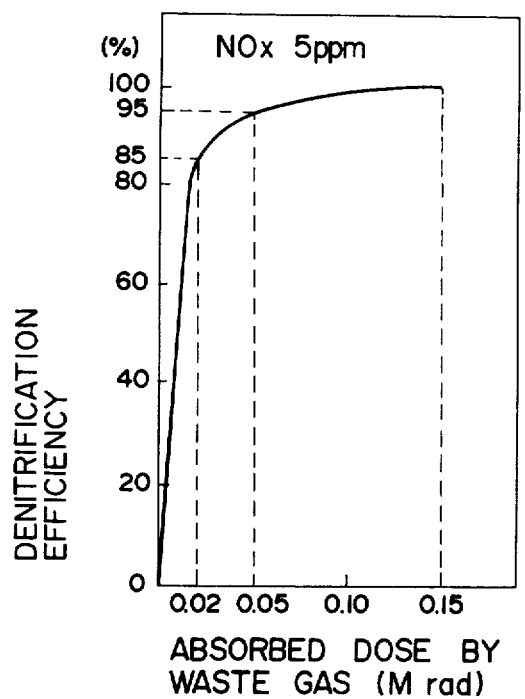
FIG. 4(c) is a graph showing the relationships between the absorbed dose by waste gas and denitrification efficiencies obtained by treating the waste gas with initial $NO_x$ concentration of 5 ppm by irradiation with an electron beam.

And furthermore, in case of treating a waste gas with initial NOx concentration of 5 ppm by the same apparatus, the efficiency by a dose of 0.02 Mrad, 0.05 Mrad and 0.15 Mrad, is 85%, 95% and 99% respectively. These unexpected and desirable, results are illustrated in FIG. 4(a), 4(b) and 4(c) respectively. Based on the above information, the inventors have derived the method of the present invention with the superior results indicated by the following example:

EXAMPLE

A waste gas with initial NOx concentration of 200 ppm was irradiated with electron beam by the method of this invention using two stages of electron beam irradiation. The denitrification efficiency was 95% with a total absorbed dose of about 1.5 Mrad by the waste gas.

Figure 4D:
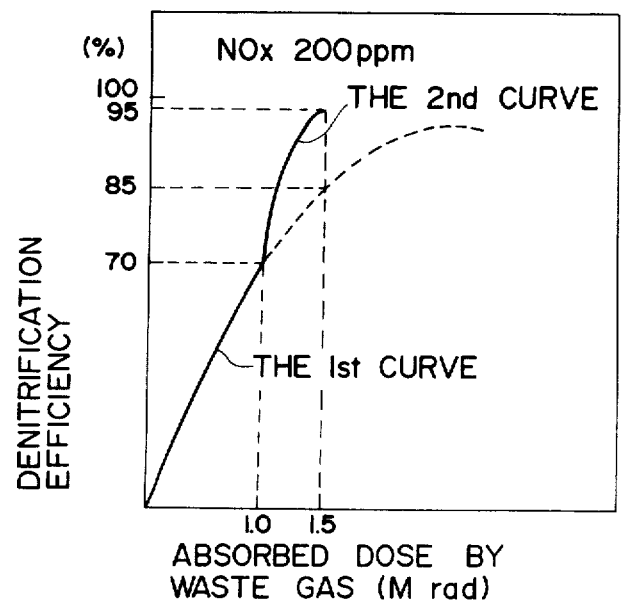
FIG. 4(d) is a graph showing the relationships between the absorbed dose by waste gas and denitrification efficiencies which was obtained by irradiating waste gas with initial $NO_x$ concentration of 200 ppm with electron beams for an absorbed dose of 1.0 Mrad in the 1st stage, then for an absorbed dose of 0.5 Mrad in the 2nd stage.

The above result is illustrated in FIG. 4(d). It is apparent that by single stage irradiation according to the conventional method, a denitrification efficiency should not possibly reach 100% and not be able to exceed 80% *with a dose of* 1.5 Mrad. This estimation can be easily done by an extended curve of the 1st curve, shown by broken line.

A concentration of NOx contained in a combustion gas from an industrial combustion chamber is usually 200–600 ppm at most. By the conventional apparatus, as will be clear from FIG. 4(a), the denitrification efficiency remains at about 80% with a total dose of 2.0 Mrad, and it cannot exceed 90% however much the dose may be, for example in the case of treating the waste gas containing 200 ppm of NOx. On the other hand, according to the method of this invention using multi-stage the denitrification efficiency reach nearly 100% with a total dose of 1.5 Mrad. It is clear that by this invention, the method of treating waste gas based on irradiation with electron beams rendered has been remarkably economical.

In addition, it is desirable as a matter of course that the second aerosol collecting device be arranged between the first irradiating unit and second unit for the purpose of obtaining the maximum total denitrification efficiency. The reason is that some of the aerosol formed in the waste gas by irradiation in the first irradiating unit when irradiated in the second unit, may decompose to reproduce NO$_x$.

This invention has a feature in that rate of dose to be given in each irradiating stage to the total required dose is determined to require the least dose. In other words, in case of a two stage method, there is no such simple relation that the first stage is for a preliminary treatment and the second stage is for a principal treatment, and a simple sum total of two stages is not expected with these being equal, and moreover there is no such a relation that the first stage is for principal and the second stage is for a simple finishing. It has been confirmed that according to this invention a high level of effect had been obtained by irradiation with a relatively large dose (not less than 60% of the total dose) in the first stage and with relatively small quantity does in the second stage.

What is claimed is:

1. An improved method of treating waste gas containing sulfur dioxide (SO₂) and nitrogen oxides (NOx) to remove said oxides wherein ammonia is added to the waste gas and the waste gas is irradiated and SO₂ and NOx are then removed from the waste gas, the improvement comprising carrying out said irradiation by multiple steps comprising
 (1) the first irradiation step comprising introducing waste gas into the first irradiation unit and irradiating the same gas in an irradiation vessel of said unit with electron beams to give a dose which is determined by the concentrations of NOx and SO₂ of the non-irradiated waste gas to thereby reduce concentrations of NOx and SO₂ to the certain predetermined levels, respectively;

(2) the second irradiation step, the third irradiation step, the fourth irradiation step,—and the n th irradiation step in sequence each comprising substantially the same procedure as that mentioned in the first irradiation step;

(3) the n th irradiation step comprising introducing the irradiated gas discharged from the (n−1) irradiation step into the n th irradiation unit and irradiating the same gas in an irradiation vessel of the n th irradiation unit with electron beams to give a dose which is determined by the concentrations of NOx and/or SO$_2$ of the waste gas discharged from the (n−1)th irradiation unit to thereby reduce the concentrations of both NOx and SO$_2$ to the intended final levels, respectively; and (4) an aerosol collection step comprising introducing the waste gas discharged form the n th irradiation step into an aerosol collector to thereby separate aerosol particles from the waste gas.

2. A method according to claim 1 wherein said irradiation steps consist of the first and the second irradiation steps (n is 2).

* * * * *